3,370,461
AIRCRAFT INSTRUMENTS
Peter Bradbury, Michael K. Russell, Eric R. Kendall, and Stanley B. Newport, Cheltenham, England, assignors to S. Smith & Sons (England) Limited, London, England, a British company
Filed Dec. 21, 1965, Ser. No. 515,432
Claims priority, application Great Britain, Dec. 24, 1964, 52,430/64
12 Claims. (Cl. 73—178)

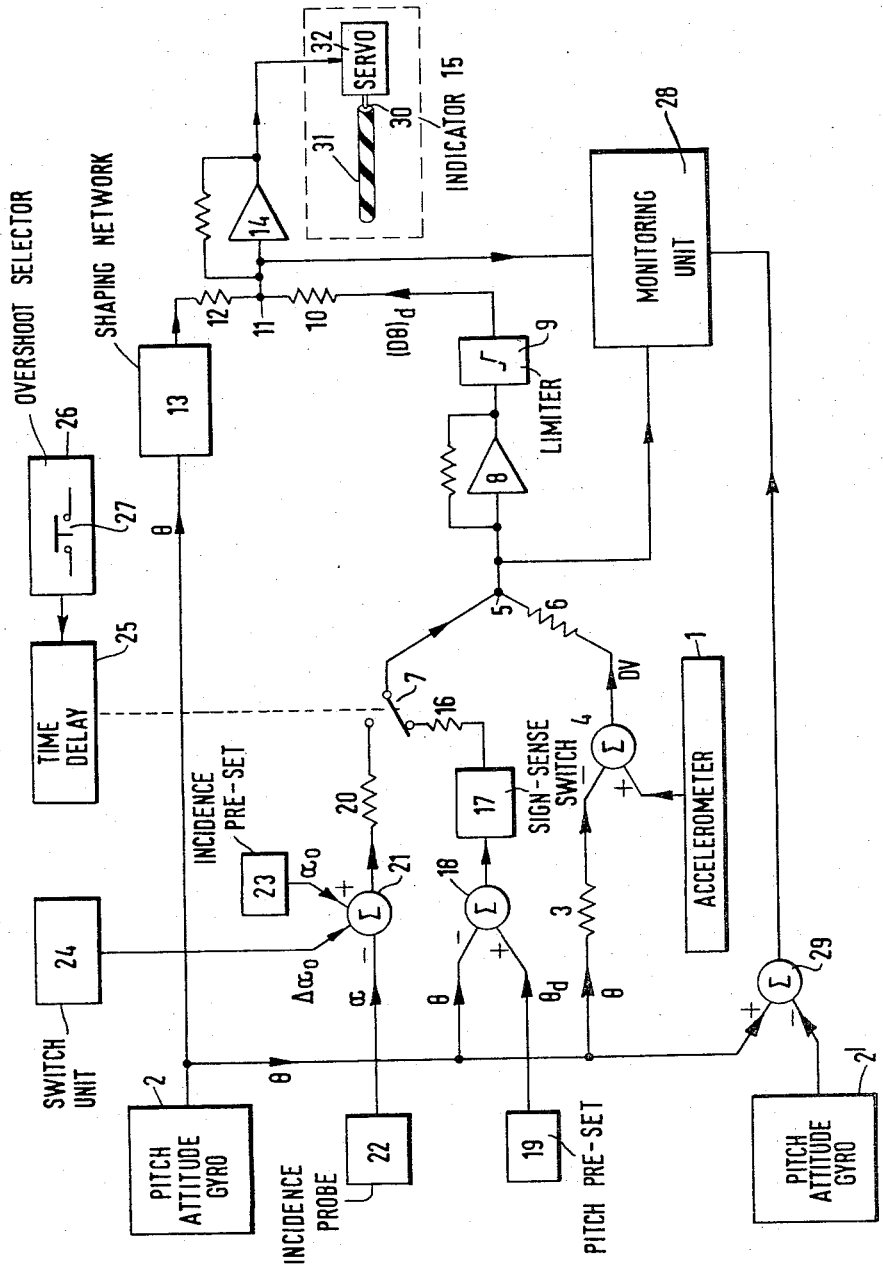

ABSTRACT OF THE DISCLOSURE

An aircraft overshoot director indicates deviation of aircraft pitch-rate from a pitch-rate demand that, during the climb-out phase of overshoot, is computed as the sum of a term proportional to the aircraft forward-acceleration and a term proportional to the extent by which the aircraft incidence-angle differs from a programmed value. The incidence term is added in the demand only after a predetermined time-delay from initiation of the overshoot. During the flare-up phase, immediately following initiation, the demand includes instead a term proportional to the extent by which the pitch attitude differs from a predetermined level-flight value.

---

This invention relates to aircraft instruments.

In U.S. Patent No. 3,309,923 issued Mar. 21, 1967, to R. I. Bishop, E. R. Kendall, and R. A. Palmer, there is described a form of aircraft instrument which according to one aspect, comprises means for providing a signal dependent upon forward acceleration of the aircraft, means for providing a signal dependent upon rate of change of pitch attitude of the aircraft, and means responsive to both signals for providing an indication which is dependent upon difference between said rate of change of pitch attitude and a function dependent upon said acceleration such that said indication is indicative of at least the sense of said difference. An aircraft instrument of the general form specified in the preceding sentence will be referred to hereinafter, for convenience, as "of the kind specified."

The above-mentioned patent contains a description of one specific form of aircraft instrument of the kind specified, in which said function dependent upon the forward acceleration of the aircraft is simply the product of the forward acceleration and a constant, the instrument as a result providing an indication of pitch rate in accordance with the equation:

$$D\theta = KDV \quad (1)$$

$\theta$ is the pitch angle of the aircraft,
$V$ is the forward velocity of the aircraft,
$K$ is a constant, and
$D$ is the differential operator representative of differentiation with respect to time, so that $D\theta$ and $DV$ are respectively the rate of change of pitch attitude and the forward acceleration of the aircraft.

It has been found that if Equation 1 is used as a director law during take-off, that is to say if the rate of change of pitch of the aircraft is maintained in constant proportion to the acceleration along the flight path during take-off, a flight path which broadly satisfies safety and operational requirements is achieved. The equation has, in particular, ben assessed by calculations covering variations in factors such as the total, all-up weight of the aircraft at take-off, and the available propulsive thrust. In respect of calculations relating to one particular multi-engine transport aircraft for example, consideration has been given to each of the combinations of circumstances that arise when the total weight is 100,000 lbs. or 160,000 lbs., and when all engines, or all engines except one, are operative. With each case the equation gives a satisfactory flight path with a satisfactory forward speed, a satisfactory margin to stall, and a satisfactory acceleration increment normal to the flight path, when a value of 0.003 or 0.004 is used for the constant K, the rate $D\theta$ being in these circumstances expressed in radians per second and the acceleration $DV$ in feet per second per second. Better speeds and speed margins are obtaind, at the expense of lower flight paths, with the value 0.003, rather than 0.004, for the constant K. A lower value than 0.003 for the constant K gives an unduly low flight path under the conditions in which one engine is inoperative, and the total weight is 160,000 lbs., while under these conditions a higher value than 0.004 does not allow enough speed margin. The acceptable range for the constant K in the case of this one particular aircraft is thus established, and can equally-well be established for other aircraft.

Co-pending U.S. patent application Ser. No. 361,404, filed Apr. 21, 1964 in the names of E. R. Kendall and S. B. Newport, contains a description of another specific form of aircraft instrument of the kind specified, the director law in this case including terms dependent, among other things, upon a desired pitch attitude for lift-off and a desired velocity for climb-out, as well as a term dependent upon aircraft acceleration along the flight path.

The various forms of aircraft instrument described in the above-mentioned patent and patent application, and also is U.S. Patent No. 3,283,573, issued Nov. 8, 1966 to R. I. Bishop, E. R. Kendall, and R. A. Palmer, are intended primarily for use during take-off manoeuvres, but it has been appreciated that such instruments can be used to assist the pilot during other manoeuvres. One particular manoeuvre that has received consideration in this respect is that of overshoot (that is to say, the manoeuvre which is initiated when an approach to a landing is abandoned), and it is an object of the present invention to provide an aircraft instrument of the kind specified which is especially adapted to assist a pilot in achieving an acceptable flight path for the overshoot manoeuvre.

According to one aspect of the present invention, in an aircraft instrument of the kind specified, it is arranged that said function is also dependent upon the extent by which the angle of incidence of the aircraft differs from a predetermined value, the arrangement being such that reduction in the difference between the angle of incidence and said predetermined value tends to reduce any said difference between rate of change of pitch attitude and said function.

According to another aspect of the present invention, an aircraft instrument comprises means for providing a first signal dependent upon forward acceleration of the aircraft, means for providing a second signal dependent upon rate of change of pitch attitude of the aircraft, means for providing a third signal dependent upon the extent by which the angle of incidence of the aircraft differs from a predetermined value, and means responsive to the first, second, and third signals to provide a fourth signal in accordance with difference between said rate of change of pitch attitude and a function that is dependent upon both said forward acceleration and the extent by which the angle of incidence differs from said predetermined value.

The said fourth signal may be used to provide an indication of the magnitude and sense of the difference between the rate of change of pitch attitude and said function, however, it may alternatively be used in more complex arrangements. For example, in the event that fully- or semi-automatic landing facilities are provided, the signal may be used more directly in the control of the aircraft.

According to a further aspect of the present invention, in an aircraft instrument of the kind specified, further means is arranged to include in said function selectively, and in addition to a term dependent upon forward acceleration, a further term, and it is arranged that said further means is operative in response to an applied signal to include said further term in said function from the end of a predetermined period of time following application of said applied signal.

An aircraft instrument in accordance with the present invention will now be described, by way of example, with reference to the accompanying drawing which shows the instrument in schematic form.

Referring to the drawing, an accelerometer 1 supplies an electric signal dependent in amplitude upon the forward acceleration DV of the aircraft. The accelerometer 1 may be provided by an arrangement in which a spring-restrained mass forms the I member of an "E and I" electromagnetic pick-off, the whole being immersed in a fluid that provides a suitable damping action. The signal supplied by the accelerometer 1 is in fact representative of $(DV + g \sin \theta)$, where $g \sin \theta$ is in this case an unwanted gravitational component which is inherently measured by the accelerometer 1. The gravitational component for small values of pitch angle $\theta$ is approximately equal to $g^\theta$, and in order to remove this unwanted component a signal representative of $g^\theta$ is derived from a signal representative of pitch angle $\theta$ supplied by a pitch attitude gyro 2. The signal representative of $g^\theta$, which is derived from the signal representative of $\theta$ via a resistor 3, is combined in a summing amplifier 4 with the signal from the accelerometer 1 such as thereby to derive a signal which is representative in amplitude of the forward acceleration DV, and which is substantially independent of the unwanted gravitational component $g \sin \theta$. This signal representative of the acceleration DV is applied to a junction-point 5 via a resistor 6 so as thereby to apply to the point 5 a signal representative of the term KDV, the value of the constant K being dependent upon the resistance of the resistor 6.

The signal received at the junction-point 5 via the resistor 6, is there combined with a signal received from a two-position switch 7. The combined signal is supplied from the point 5 to an amplifier 8 and thence via a limiter unit 9 and a resistor 10 to a further junction-point 11. The signal supplied by the limiter unit 9 is representative of a pitch rate demand $(D\theta)_d$, and after passage via the resistor 10 is combined at the junction-point 11 with a signal received via a resistor 12 from a shaping network 13. The network 13, which is supplied with the signal representative of pitch angle $\theta$ derived by the pitch attitude gyro 2, has a transfer function:

$$D/(1+\tau_1 D)$$

where $\tau_1$ is a constant.

The combined signal at the junction-point 11, as a result, provides a measure of pitch-rate error:

$$[D/(1+\tau_1 D)]\theta - A(D\theta)_d \quad (2)$$

The pitch-rate error-signal is passed from the junction-point 11 via an amplifier 14 to an indicator unit 15 that provides an indication of the magnitude and sense of function (2). Such indication thereby provides a visual representation of the extent to which the actual pitch rate $D\theta$ differs from the demanded rate $(D\theta)_d$.

The demanded pitch rate $(D\theta)_d$ represented by the signal supplied by the limiter unit 9 is limited, under the action of the unit 9, to a maximum value of, for example, 2.5 degrees per second, and is one of the following three functions:

$$KDV + (\theta_d - \theta)/\tau_2 \quad (3)$$
$$KDV \quad (4)$$
$$KDV + H(\alpha_d - \alpha) \quad (5)$$

where:

$\theta_d$ is a predetermined value of the pitch-angle $\theta$ that it is desired to achieve immediately after initiation of an overshoot manoeuvre;

$\tau_2$ and H are constants;

$\alpha$ is the angle of incidence of the aircraft; and $\alpha_d$ is a predetermined value of the angle of incidence $\alpha$ that it is desired to achieve during the substantially steady climb-out phase of the overshoot manoeuvre.

The particular one of the three functions (3), (4), and (5) which is applicable at any one time is dependent upon the signal supplied from the switch 7 to the junction-point 5. The switch 7 when in a first of its two positions (as shown) supplies to the junction-point 5 a signal which it receives via a resistor 16 from a sign-sensitive switch unit 17. The unit 17 receives from a summing amplifier 18 a signal representative of the difference $(\theta_d - \theta)$, such signal being derived in the amplifier 18 from the signal representative of pitch angle $\theta$ supplied by the pitch attitude gyro 2, and a signal representative of a predetermined, desired pitch angle $\theta_d$ supplied by a pre-set unit 19. The signal derived by the amplifier 18 is passed on by the unit 17 only so long as the difference $(\theta_d - \theta)$ is not less than zero. When the difference $(\theta_d - \theta)$ is less than zero, a signal representative of zero is supplied to the switch 7 from the unit 17. Thus, when the switch 7 is in its first position, the demanded pitch rate $(D\theta)_d$ has the form of function (3) until the demanded pitch angle $\theta_d$ has been achieved (the value of the constant $\tau_2$ being dependent upon the resistance of the resistor 16), and then has the form of function (4).

The switch 7 when switched over to the second of its two positions, supplies to the junction-point 5 a signal which it receives via a resistor 20 from a summing amplifier 21. The signal supplied by the summing amplifier 21 is representative of the difference $(\alpha_d - \alpha)$ and is derived in the amplifier 21 from three signals. A first of these three signals is supplied by a conventional incidence-probe device 22 mounted on the aircraft, and is representative of the actual angle of incidence $\alpha$ of the aircraft. The second signal is supplied by a pre-set unit 23 and is representative of a predetermined, basic angle of incidence $\alpha_o$, whereas the third signal is supplied from a switch unit 24 and is representative of a predetermined desired change $\Delta\alpha_o$ from the basic angle $\alpha_o$. The unit 24 is responsive to the setting of a switch (not shown) which is actuated by the pilot of the aircraft in accordance with the setting of the aircraft flaps. The value of the change $\Delta\alpha_o$ represented by the signal supplied from the unit 24 to the amplifier 21 is dependent upon the flap setting chosen, such that the sum $(\alpha_o + \Delta\alpha_o)$ provides the desired value, $\alpha_d$, of angle of incidence appropriate to the flap setting in each case. Thus, when the switch 7 is in its second position the demanded pitch rate $(D\theta)_d$ is of the form of function (5), the angle $\alpha_d$ having whichever of a plurality of predetermined values is appropriate to the flap setting, and the value of the constant H being dependent upon the resistance of the resistor 20.

The switch 7 is normally held in its first position, and is switched over to its second position under the control of a time-delay unit 25. The unit 25, in its turn, is controlled by an overshoot connector unit 26 that includes a push-button 27. The push-button 27 is actuated by the pilot of the aircraft if during an approach to a landing he decides to abandon the landing manoeuvre and perform an overshoot. Actuation of the push-button 27, which is accompanied by application of full engine-throttle but no change in configuration of the aircraft, immediately brings the whole instrument into operation to provide the pilot with a visual indication of the control that is required in pitch to ensure that an acceptable flight path is achieved through the overshoot manoeuvre. As part of this process of bringing the instrument into operation, the unit 26 supplies energization current to the time-delay unit 25 and this, after a predetermined period of time of, for example, eight seconds, switches the switch 7 from its first to its second position. Thus, after the pushbutton 27 is actuated upon initiating the overshoot manoeuvre, and until the pitch angle $\theta_d$ is achieved, the indicator 15 is driven to provide an indication in magnitude and sense of any departure of the pitch rate from the demanded value given by function (3).

The attitude-error term $(\theta_d-\theta)/\tau_2$ added to the basic term KDV in function (3), ensures that the pitch-rate demand $(D\theta)_d$ can fall to zero only by the achievement of the desired pitch angle $\theta_d$. The higher rate of change of pitch attitude implied by this added term has the immediate effect of reducing loss of height in the interval before the increase in engine thrust becomes effective at the beginning of the overshoot manoeuvre. The angle $\theta_d$ is preferably chosen so that when $(\theta_d-\theta)$ becomes zero the aircraft flight path is substantially horizontal, this situation being achieved in normal circumstances well before the delay period, of eight seconds, set by the unit 25 has elapsed.

After the pitch angle $\theta_d$ has been achieved and before eight seconds has elapsed, the indicator 15 is driven to provide an indication in magnitude and sense of any departure of the pitch rate from the demanded value given by function (4). The operation of the instrument is at this time in accordance with the director law of Equation 1, and this directs the pilot to achieve a flare-up flight-path in accordance with the performance-capability of the aircraft.

By the time eight seconds have elapsed from initiation of the overshoot manoeuvre and the switch 7 has consequently been switched over to its second position, the aircraft is entering the climb-out phase of the overshoot manoeuvre. With the switch 7 in its second position, the indicator 15 is driven to provide an indication in magnitude and sense of any departure of the pitch rate from the demanded value given by function (5). The incidence-error term $H(\alpha_d-\alpha)$ added to the basic term KDV in this function, ensures that the pitch-rate demand can fall to zero only by the achievement of the desired incidence angle $\alpha_d$ for climb-out.

If it is found that the abrupt changeover from function (4) to function (5) produces an undesirably large change in the signal supplied to the indicator unit 15, this may be reduced by arranging that the term $(\alpha_d-\alpha)$ is introduced slowly.

Furthermore, it may be arranged that the output of the accelerometer 1 is limited in magnitude so that in the event of conditions in which the aircraft is lightly loaded and full power is used, climb-out at an undesirably-steep angle is not demanded.

The indicator unit preferably includes an indicator of the general kind described in U.S. Patent No. 3,191,147 of A. M. A. Majendie issued June 22, 1965 but may be a normal form of director-horizon instrument or a center-zero meter of conventional form. In the former case, the indicator unit 15 may be specifically as described in U.S. Patent No. 3,085,429 of A. M. A. Majendie, issued Apr. 16, 1963, as represented in the patent drawing, may include one or more cylindrical members 30 each of which is mounted for rotation about its longitudinal axis and carries an optically distinct helical band 31 coaxial therewith. The cylindrical member 30 in each case is rotated by a servo system 32 at a rate and in a sense dependent upon the magnitude and sense respectively of the signal supplied to unit 15, so that the helical band 31 provides an optical effect of linear movement at a rate and in a sense dependent upon the magnitiude and sense of function (2). When this indicator is used, the pilot controls the aircraft in pitch to maintain the condition in which the cylindrical member 30 does not rotate, thereby to comply with the relevant director law.

As shown in the accompanying drawing, provision is made for monitoring the operation of the instrument. In this respect, a unit 28 is supplied with the signals appearing at the junction-points 5 and 11, and also with a signal that is derived by a summing amplifier 29. This latter signal is derived from the signal representative of pitch attitude $\theta$ supplied by the pitch attitude gyro 2, and a signal, also representative of pitch attitude $\theta$, supplied by an identical pitch attitude gyro 2', the derived signal being represenative of any difference between these two representations of pitch angle. The unit 28 is responsive to the condition in which any one, or more, of the three signals it receives exceeds a predetermined value, to operate warning devices (not shown). The warning devices, which for example may be warning flags, are therefore operated in the event that there is significant discrepancy between the representations provided by the gyros 2 and 2', or significant increase in the signal-level at either junction-point 5 and 11. The open-loop gain of each amplifier 8 and 14 is very large so that the signal-level at its associated junction-point 5 or 11 is normally small, and in the event of significant malfunction of either amplifier there is increase in this level sufficient to cause operation of the warning devices.

Although use of a term dependent upon the extent by which the angle of incidence of the aircraft differs from a predetermined value has been described above in relation to the climb-out phase of the overshoot manoeuvre, such a term may also be used in a similar manner, in the basic control law of Equation 1 for the climb-out phase of take-off.

We claim:
1. An aircraft instrument comprising means for providing a first signal dependent upon forward acceleration of the aircraft, means for providing a second signal dependent upon rate of change of pitch attitude of the aircraft, means for providing a third signal dependent upon the extent by which the angle of incidence of the aircraft differs from a predetermined value, and means responsive to the first, second, and third signals to provide an indication of at least the sense of any difference between said rate of change of pitch attitude and a function that has contemporaneously first and second terms dependent respectively upon said first and third signals, said first term varying with said forward acceleration and said second term varying with the extent by which the angle of incidence differs from said predetermined value.

2. An aircraft instrument according to claim 1 including summing means responsive to said first and third signals to provide said function as the algebraic sum of at least (two) said first and second terms, said first term being proportional to said forward acceleration and the said second term being proportional to the extent to which the angle of incidence differs from said predetermined value.

3. An aircraft instrument comprising means for providing a first signal dependent upon forward acceleration of the aircraft, means for providing a second signal dependent upon rate of change of pitch attitude of the aircraft, means for providing a third signal dependent upon the extent by which angle of incidence of the aircraft differs from a predetermined value, and means responsive to the first, second, and third signals to provide a fourth signal in accordance with difference between said rate of change of pitch attitude and a function that has contemporaneously first and second terms dependent respectively upon said first and third signals, said first term varying with said forward acceleration and said second term varying with the extent by which the angle of incidence differs from said predetermined value.

4. An aircraft instrument according to claim 3 including an indicator for providing in accordance with the fourth signal an indication of the magnitude and sense of the difference between said rate of change of pitch attitude and said function.

5. An aircraft instrument according to claim 3 wherein the means for providing said first signal comprises an accelerometer for supplying a signal which has a first component dependent upon said acceleration and, inherently, a second component dependent both upon gravity and the pitch attitude of the aircraft, a pitch attitude unit for supplying a signal dependent upon the pitch attitude, and means responsive to the signals supplied by the accelerometer and the pitch attitude unit to supply a signal which is dependent upon said first component but substantially independent of said second component of the accelerometer signal.

6. An aircraft instrument according to claim 3 including summing means which has two input paths and which is for supplying a signal respresentative of the algebraic sum of any signals supplied thereto via the two input paths, means for supplying said first signal to the summing means via one of the input paths, and switch means for selectively supplying said third signal to the summing means via the other input path.

7. An aircraft instrument comprising means for providing a first signal in accordance with forward acceleration of the aircraft; means for providing a second signal in accordance with rate of change of pitch attitude of the aircraft; means for providing a third signal in accordance with the extent by which angle of incidence of the aircraft differs from a predetermined value; summing means responsive to the first and third signals to provide a fourth signal in accordance with the algebraic sum of at least two terms, a first of the two terms being proportional to said forward acceleration and the second of the two terms being proportional to the extent by which the angle of incidence differs from said predetermined value; and means for providing a measure of any difference between said second and fourth signals.

8. An aircraft instrument comprising first means for providing a first signal dependent upon forward acceleration of the aircraft, second means for providing a second signal dependent upon rate of change of pitch attitude of the aircraft, third means responsive to said first and second signals to provide a representation of at least the sense of any difference between said rate of change of pitch attitude and a function that includes a term dependent upon said forward acceleration, and fourth means selectively operable to supply a control signal to said third means, said third means including means responsive to said control signal to introduce in said function a further term to augment said term dependent upon forward acceleration from the end of a predetermined period of time following the supply of said control signal.

9. An aircraft instrument according to claim 8 including means for providing a third signal dependent upon angle of incidence of the aircraft, and wherein said means responsive to said control signal is means also responsive to said third signal to provide said further term as dependent upon the angle of incidence.

10. An aircraft instrument comprising means for providing a first signal dependent upon forward acceleration of the aircraft, means for providing a second signal dependent upon rate of change of pitch attitude of the aircraft, means for providing a third signal dependent upon the extent by which angle of incidence of the aircraft differs from a predetermined value, means responsive to the first, second, and third signals to provide a fourth signal in accordance with difference between said rate of change of pitch attitude and a function that is dependent upon both said forward acceleration and the extent by which the angle of incidence differs from said predetermined value, and an indicator for providing in accordance with the fourth signal an indication of the magnitude and sense of the difference between said rate of change of pitch attitude and said function, said indicator comprising a rotatable member, and means for rotating said rotatable member at a rate and in a sense dependent upon the magnitude and sense respectively of said difference between the rate of change of pitch attitude and said function, said rotatable member being a cylindrical member mounted for rotation about its longitudinal axis and having an optically distinct helical band coaxial therewith for providing an optical effect of movement at a rate and in a sense dependent respectively upon the rate and sense of rotation of the cylindrical member.

11. An aircraft instrument comprising first means for providing a first signal dependent upon forward acceleration of the aircraft, second means for providing a second signal dependent upon rate of change of pitch attitude of the aircraft, third means for providing a third signal dependent upon the extent by which the pitch attitude of the aircraft differs from a predetermined value of pitch attitude, fourth means for providing a fourth signal dependent upon the extent by which angle of incidence of the aircraft differs from a predetermined value of incidence, fifth means responsive to said first, second, third and fourth signals to provide a signal in accordance with difference between said rate of change or pitch attitude and a function that is dependent upon said forward acceleration, said function also being dependent selectively upon either the extent to which said pitch attitude differs from said predetermined value of pitch attitude or the extent to which said angle of incidence differs from said predetermined value of incidence, said fifth means including summing means which has two input paths for supplying a signal representative of the algebraic sum of any signals supplied thereto via said two input paths, means for supplying said first signal to the summing means via one of the input paths, and switch means that is selectively switchable between a first state in which it supplies said third signal to the summing means via said other input path and a second state in which it supplies said fourth signal to the summing means via said other input path.

12. An aircraft instrument according to claim 11 including means that is selectively operable to supply a control signal, a switch-controller responsive to said control signal to switch said switch means from said first state to said second state at the end of a predetermined period following the supply of said control signal.

References Cited

UNITED STATES PATENTS

| 3,077,109 | 2/1963 | Gold | 73—178 |
| 3,200,642 | 8/1965 | Neuendorf et al. | 73—178 |
| 3,295,369 | 1/1967 | Priestley | 73—178 |

LOUIS R. PRINCE, *Primary Examiner.*

DAVID SCHONBERG, *Examiner.*

N. B. SIEGEL, *Assistant Examiner.*